(12) United States Patent
Parviainen

(10) Patent No.: US 9,178,399 B2
(45) Date of Patent: Nov. 3, 2015

(54) LAMINATED ROTOR STRUCTURE FOR A PERMANENT MAGNET SYNCHRONOUS MACHINE

(75) Inventor: Asko Parviainen, Lappeenranta (FI)

(73) Assignee: AXCO-Motors Oy, Lappeenranta (FI)

( * ) Notice: Subject to any disclaimer, the term of this patent is extended or adjusted under 35 U.S.C. 154(b) by 285 days.

(21) Appl. No.: 13/981,749

(22) PCT Filed: Jan. 25, 2012

(86) PCT No.: PCT/FI2012/050065
§ 371 (c)(1),
(2), (4) Date: Jul. 25, 2013

(87) PCT Pub. No.: WO2012/101328
PCT Pub. Date: Aug. 2, 2012

(65) Prior Publication Data
US 2013/0307358 A1    Nov. 21, 2013

(30) Foreign Application Priority Data

Jan. 26, 2011 (FI) ..................................... 20115076

(51) Int. Cl.
*H02K 1/32* (2006.01)
*H02K 9/06* (2006.01)
(Continued)

(52) U.S. Cl.
CPC .................. *H02K 9/06* (2013.01); *H02K 1/223* (2013.01); *H02K 1/2766* (2013.01); *H02K 1/32* (2013.01); *H02K 9/02* (2013.01)

(58) Field of Classification Search
USPC ......... 310/59, 60 A, 61, 156.74–156.81, 211, 310/156.53
See application file for complete search history.

(56) References Cited

U.S. PATENT DOCUMENTS 4,445,062 A    4/1984  Glaser
6,268,677 B1 *  7/2001  Takabatake et al. ..... 310/156.55
(Continued)

FOREIGN PATENT DOCUMENTS

DE    40 33 454 A1    4/1992
JP    2000-139063 A    5/2000
(Continued)

OTHER PUBLICATIONS

International Search Report for corresponding International Patent Application No. PCT/FI2012/050065 mailed Apr. 11, 2012.

*Primary Examiner* — Thanh Lam
(74) *Attorney, Agent, or Firm* — Merchant & Gould P.C.

(57) ABSTRACT

The invention relates to a laminated rotor structure for a permanent magnet synchronous machine wherein disks (1) of a ferromagnetic material constitute the body of the rotor. The body includes bars (3) of a damper winding that extend axially close to the surface (2) from one end thereof to the other, and a circle of permanent magnets (4) disposed in a V-shaped configuration inside the circle formed by the bars, in which permanent magnets the first ends (5) are disposed close to the outer perimeter of the rotor and the second ends (6) are disposed closer to the central axis of the rotor. According to the invention, two permanent magnets (4) constitute a pair of permanent magnets wherein the magnets are disposed at an angle (a) to each other so that their first ends (5) are disposed at a distance from each other and their second ends (6) in proximity to each other. In addition, a pair of permanent magnets includes an air channel (7) that extends axially through the laminar structure of the rotor in direct heat transfer contact with the second ends (6) of the magnets in the pair of magnets.

10 Claims, 2 Drawing Sheets

Figure 1:
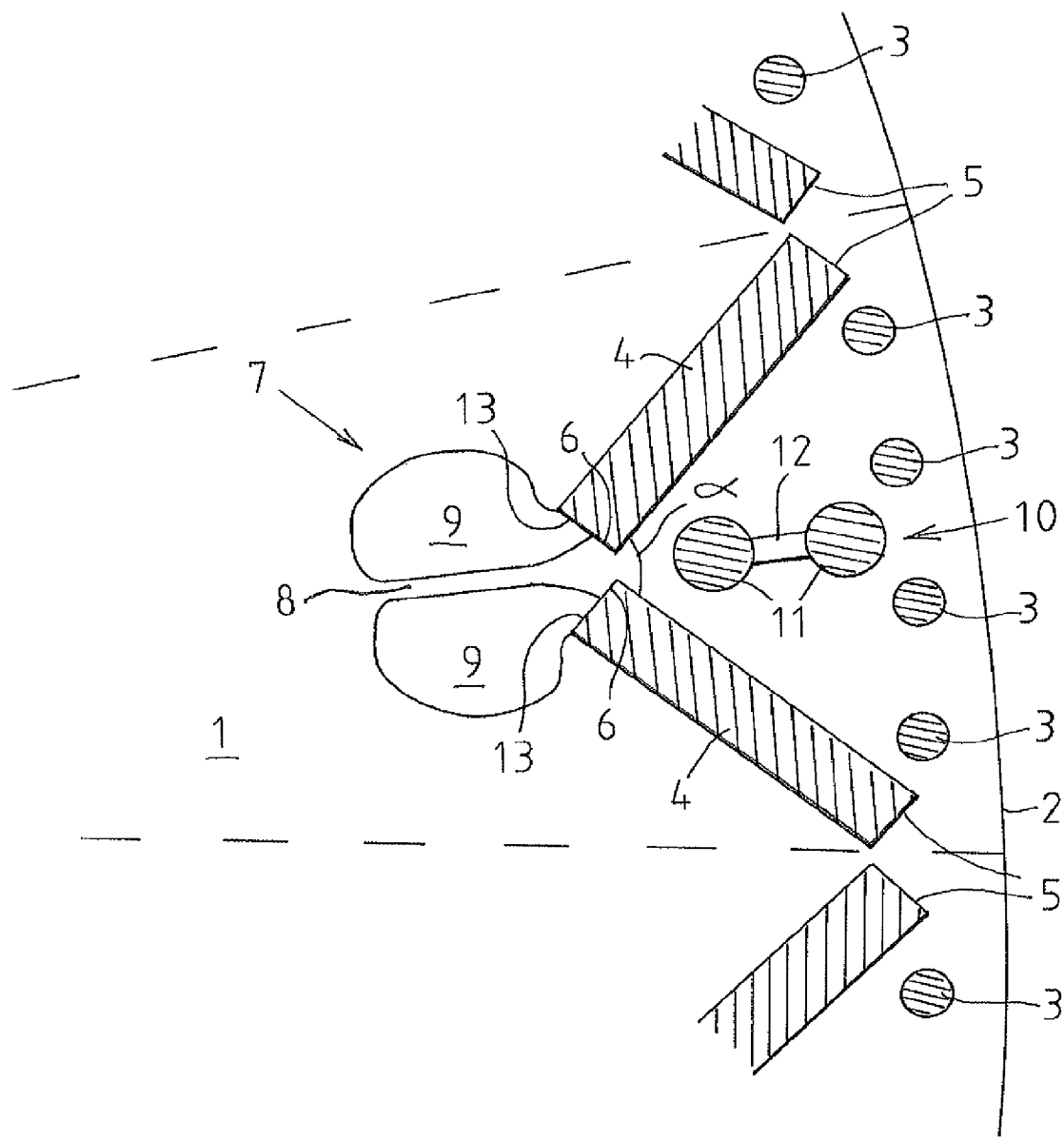

(51) Int. Cl.
*H02K 1/22* (2006.01)
*H02K 1/27* (2006.01)
*H02K 9/02* (2006.01)

(56) References Cited

U.S. PATENT DOCUMENTS

| | | | |
|---|---|---|---|
| 6,876,119 B2 * | 4/2005 | Taniguchi et al. | 310/211 |
| 7,923,881 B2 * | 4/2011 | Ionel et al. | 310/156.83 |
| 7,923,882 B2 * | 4/2011 | Kalluf et al. | 310/156.83 |
| 2007/0284961 A1 * | 12/2007 | Takahashi et al. | 310/156.78 |
| 2009/0015081 A1 | 1/2009 | Takenaka et al. | |
| 2009/0160285 A1 * | 6/2009 | Kikuchi et al. | 310/156.78 |
| 2010/0017037 A1 * | 1/2010 | Nam et al. | 700/275 |

FOREIGN PATENT DOCUMENTS

| | | |
|---|---|---|
| JP | 2006-050821 A | 2/2006 |
| JP | 2007-104888 A | 4/2007 |
| WO | WO 2007/025180 A1 | 3/2007 |

* cited by examiner

LAMINATED ROTOR STRUCTURE FOR A PERMANENT MAGNET SYNCHRONOUS MACHINE

This application is a National Stage Application of PCT/FI2012/050065, filed 25 Jan. 2012, which claims benefit of Serial No. 20115076, filed 26 Jan. 2011 in Finland and which applications are incorporated herein by reference. To the extent appropriate, a claim of priority is made to each of the above disclosed applications.

FIELD OF THE INVENTION

The invention relates to a laminated rotor structure for a permanent magnet synchronous machine as defined in the preamble of claim 1.

BACKGROUND OF THE INVENTION

In permanent magnet synchronous machines it is common to use laminated rotor structures, i.e. disk rotors, wherein the actual body of the rotor around the shaft is made from a large number of round and thin ferromagnetic metal disks that are identical in shape, disposed perpendicularly relative to the shaft and packed into a tight assembly. The permanent magnets are then provided to the body of the rotor, either to the surface or embedded deeper as rods extending from one end of the cylindrical rotor to the other.

In the invention, the permanent magnets are disposed inside the rotor body in a ring-type V-shape configuration known per se, i.e. the first ends of the permanent magnets are close to the surface of the rotor and the second ends are closer to the central axis but disposed at an angle to the radial direction. This way, every second magnet is inclined in one direction and every second in the other direction relative to the radial direction. This type of structure has been disclosed in publication JP 2006050821. The purpose of said structure has been to minimize the leakage flux and at the same time to achieve sufficient rigidity of the rotor when using permanent magnets that are embedded in the rotor.

Another structure representing the prior art has been disclosed in patent U.S. Pat. No. 4,445,062. It features permanent magnet rods embedded in the rotor, in radial grooves on the surface thereof, in such a way that the poles of the permanent magnets are disposed one after the other in the circumferential direction. The bottom of a groove is so dimensioned or shaped relative to the permanent magnet as to form on the bottom of the groove a gap that can act as a cooling air channel that extends axially through the rotor. The purpose of the structure is simply and securely to fix the magnets in place in the rotor. The publication does not discuss minimization of the leakage flux of the magnets.

The ferromagnetic disk pack constitutes a good body for the rotor around the magnets, but heating of the rotor and particularly of the magnets causes problems specifically in large machines. Another problem is the leakage flux of the rotor and the armature reaction, i.e. the magnetic flux tends to move sideways on the rotor pole, which is not a desirable phenomenon.

OBJECTIVE OF THE INVENTION

The objective of the invention is to remedy the defects of the prior art referred to above. In particular, the objective of the invention is to disclose a novel laminate rotor structure wherein the excessive heating of the magnets has been prevented and wherein the magnetic fluxes are made to move in an optimal fashion, minimizing the leakage fluxes.

SUMMARY OF THE INVENTION

In the laminated rotor structure for a permanent magnet synchronous machine according to the invention, disks of a ferromagnetic material constitute the body of the rotor. Thus, the body consists of a disk pack, i.e. of a large number of thin ferromagnetic round disks disposed tightly together one after the other in the axial direction of the rotor, i.e. together constituting a substantially cylindrical piece. The body includes bars of a damper winding that extend axially from one end thereof to the other close to the surface, and, inside the circle formed by the bars, a circle of permanent magnets provided in a V-shape configuration. In the permanent magnets, the first ends are disposed close to the outer perimeter of the rotor and the second ends closer to the central axis of the rotor. In this case, two permanent magnets constitute a pair of permanent magnets, wherein the magnets are disposed at an angle to each other so that their first ends are disposed at a distance from each other and the second ends in proximity to each other. Further according to the invention, a pair of permanent magnets includes an air channel that extends axially through the laminar structure of the rotor in direct heat transfer contact with the second ends of the magnets in the pair of magnets. Thus, the air channel effectively cools the laminate structure and thereby the permanent magnets, and also directly the second end of the permanent magnets disposed in direct heat transfer communication with the air flow. The inner ends of the permanent magnets are effectively cooled by the effect of the air channels that are disposed in direct heat transfer contact therewith. In other words, a small part of the surface of the inner end of a magnet constitutes part of the surface of the air channel. The outer ends of the magnets, in turn, are effectively cooled as their heat is conducted through the outer surface of the rotor to the air flow that circulates in an air gap between the rotor and the stator. Thus, the permanent magnets are cooled effectively and evenly, i.e. significant temperature differences between their different ends are not able to develop.

Preferably, the air channel is located toward the shaft of the rotor from the second ends of the magnets so that they do not constitute an obstacle for the movement of the magnetic flux between neighboring V-shaped magnets. Most suitably, the air channel is symmetrical to the bisector of the angle between the magnets in the radial direction of the rotor.

In one embodiment of the invention, the air channel includes a ferromagnetic neck in the direction of the bisector of the angle between the magnets, i.e. in the radial direction of the rotor, dividing the air channel in two subchannels that are symmetrical relative to the neck. Appropriately dimensioned, the neck minimizes the need for magnetic material and the leakage flux, directing the magnetic flux around the subchannels. Further, the neck acts as a mechanical radial support to the centrifugal forces of the rotor.

In one embodiment of the invention, the angle between a pair of permanent magnets that opens outward from the rotor includes a non-ferromagnetic support structure extending axially through the rotor. This support structure, combined with the bars of the damper winding that are suitably placed close to the outer perimeter of the rotor, reduces the armature reaction of the generator, which leads to better properties for the machine.

Preferably, the support structure is formed by a structure disposed on the bisector of the angle between the permanent magnets in the radial direction of the rotor. The structure may be for example flat steel placed in the narrow gap in the radial direction of the rotor, which gap extends also in the axial direction of the rotor over the entire length thereof.

In one embodiment of the invention, the support structure includes two non-ferromagnetic support bolts disposed at a distance from each other in the radial direction of the rotor, and an air gap disposed in the radial direction of the rotor to connect them. Thus, the support bolts together with the more narrow air gap therebetween constitute a radial wall that directs the magnetic flux to pass between the magnets mainly in the radial direction. Further, the support bolts give mechanical strength to the laminate body of the rotor in order better to resist centrifugal forces.

The laminated rotor structure for a permanent magnet synchronous machine according to the invention provides considerable advantages as compared to the prior art. The temperature of the rotor and, most importantly, of the magnets therein can be kept within allowable limits to maintain their magnetic properties. Further, the magnetic flux is made to move in the rotor structure in an optimal fashion by virtue of the properly placed flux blocks, minimizing leakage fluxes of the permanent magnets, which has a considerable effect on the size of the electric machine. In addition, the rotor is made mechanically robust by virtue of the inventive structure.

LIST OF FIGURES

Figure 2:
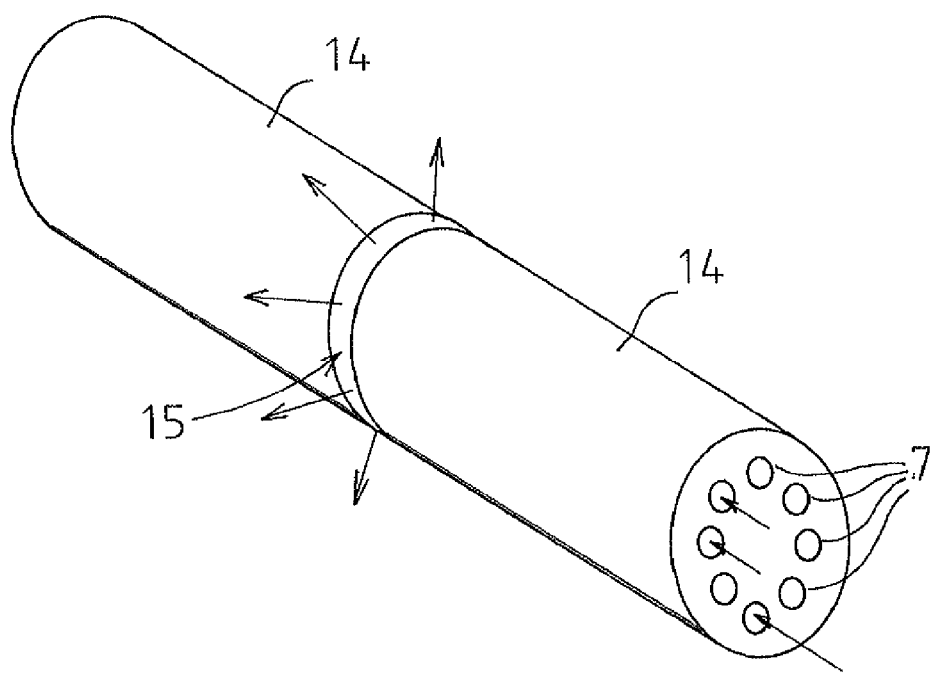

In the following, the invention will be described in detail with reference to the accompanying drawings, in which FIG. 1 presents a sectional view of a sector of the structure of a rotor according to the invention and FIG. 2 schematically presents air circulation of the rotor.

DETAILED DESCRIPTION OF THE INVENTION

FIG. 1 presents the structure of a rotor that has been laminated from ferromagnetic disks in a permanent magnet synchronous machine. More specifically, a sectional view of a sector delimited by dash lines, including one V-shaped pair of permanent magnets. There may be a number of these kinds of sectors present in the rotor, for example at least eight or even much more.

The rotor thus consists of a large number of ferromagnetic round disks tightly disposed side by side as a single pack in the axial direction of the rotor. The structures included in the sector extend axially, identically and unchangeably, through the entire disk pack structure of the rotor. In proximity to the surface 2 of a disk 1 inside the rotor there are a number of generally copper-made bars 3 of a damper winding, connected in a manner known per se to copper short-circuiting rings disposed at each end of the rotor. Two permanent magnets 4 are disposed at an angle α to each other so that the first ends 5 of the magnets are disposed at a distance from each other close to the outer surface 2 of the rotor and the second ends 6 are disposed closer to the shaft of the rotor adjacent to each other but not entirely engaged to each other.

The angle α between the magnets 4 that opens outward encompasses a support structure formed by two non-ferromagnetic support bolts 11 mounted in the radial direction on the bisector of the angle α and by an air gap 12 to connect them, having a width that is smaller than the diameter of the bolts. The support bolts and the air gap together constitute a non-ferromagnetic structure that directs the magnetic flux in the area of the angle α to the radial direction of the rotor.

Provided from the second end 6 of the magnets 4 toward the shaft of the rotor there is an air channel 7 that extends from one end of the rotor to the other. The air channel 7 is formed by two subchannels 9, and between the subchannels there is a radial neck 8 disposed in the direction of the bisector of the angle α that is made of the same monolithic material as the disk 1. The subchannels 9 are so shaped as to be in direct heat transfer communication with the second end 6 of the respective magnet 4 over a specific segment 13 of the end of the magnet. Thus, the magnets stay tightly and precisely in place, while being at the same time efficiently cooled by virtue of the air flow that directly flushes their surface.

The purpose of the neck 8 made from the material of the disk 1 is effectively to direct the magnetic flux around the subchannels 9 in order to minimize the leakage flux. Another purpose of the neck 8 is mechanically to support the rotor structure in the radial direction, as the strong centrifugal forces that act on the magnets 4 and the bars 3 could damage the rotor without the neck 8 giving support to the structure.

FIG. 2 presents one embodiment of the invention wherein the rotor having a laminate structure consists of two subrotors 14 that are disposed axially one after the other. The subrotors are mechanically and fixedly joined together to form a jointly operating assembly, while having a radial gap 15 therebetween. The gap 15 extends to the outer surface of the rotor from the air channels 7 that run axially inside the rotor from one end to the other. The subrotors 14 may even be fixedly mounted to each other in the rotor inward from the air channels 7. Thus, the air channels 7 act as air supply channels for the radial gap or gaps 15 that effectively supply in the radial direction the air flow that flows axially through the rotor to the stator as the cooling air it needs. The cooling flow is provided in this structure effectively and even in the correct order because the rotor that is more critical in terms of excessive heating is cooled first, and the stator is cooled thereafter by the same air flow. The radial gap and any possible blades or corresponding members therein constitute an effective centrifugal blower by which the cooling of the rotor and the stator is carried out effectively.

The invention is not limited merely to the examples referred to above; instead, many variations are possible within the scope of the inventive idea defined by the claims.

The invention claimed is:

1. A laminated rotor structure for a permanent magnet synchronous machine wherein disks of a ferromagnetic material constitute the body of the rotor that includes bars of a damper winding extending axially close to the surface from one end thereof to the other, and a circle of permanent magnets disposed in a V-shaped configuration inside the circle formed by the bars, in which permanent magnets the first ends are disposed close to the outer perimeter of the rotor and the second ends are disposed closer to the central axis of the rotor, wherein two permanent magnets constitute a pair of permanent magnets wherein the magnets are disposed at an angle to each other so that their first ends are disposed at a distance from each other and their second ends in proximity to each other, and that a pair of permanent magnets includes an air channel that extends axially through the laminar structure of the rotor in direct heat transfer contact with the second ends of the magnets in the pair of magnets.

2. The rotor structure according to claim 1, wherein the air channel is located toward the shaft of the rotor from the second ends of the magnets.

3. The rotor structure according to claim 1, wherein the air channel is symmetrical relative to the bisector of an angle in the radial direction of the rotor.

4. The rotor structure according to claim 3, wherein the air channel includes a ferromagnetic neck disposed in the direction of the bisector of the angle, dividing the air channel in two subchannels that are symmetrical relative to the neck.

5. The rotor structure according to claim 1, wherein the angle between a pair of permanent magnets includes a non-ferromagnetic support structure that extends axially through the rotor.

6. The rotor structure according to claim 5, wherein the support structure is formed by a structure disposed on the bisector of the angle in the radial direction of the rotor.

7. The rotor structure according to claim 5, wherein the support structure includes two non-ferromagnetic support bolts disposed at a distance from each other in the radial direction of the rotor and an air gap provided in the radial direction of the rotor to connect them.

8. The rotor structure according to claim 5, wherein the support structure is formed by non-ferromagnetic flat steel disposed in a thin gap provided in the radial direction of the rotor.

9. The rotor structure according to claim 1, wherein the rotor consists in the axial direction thereof of at least two subrotors, between which there is a radial gap that connects the air channels to the outer surface of the rotor.

10. The rotor structure according to claim 9, wherein the radial gap constitutes a centrifugal blower by which an air flow is provided to the air channels.

* * * * *